United States Patent
Oba

(10) Patent No.: US 10,462,372 B2
(45) Date of Patent: Oct. 29, 2019

(54) IMAGING DEVICE, IMAGING SYSTEM, AND IMAGING METHOD

(71) Applicant: SONY CORPORATION, Tokyo (JP)

(72) Inventor: Eiji Oba, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/144,222

(22) Filed: Sep. 27, 2018

(65) Prior Publication Data

US 2019/0028651 A1  Jan. 24, 2019

Related U.S. Application Data

(63) Continuation of application No. 14/744,684, filed on Jun. 19, 2015, now Pat. No. 10,110,820, which is a (Continued)

(30) Foreign Application Priority Data

Aug. 27, 2010 (JP) ................ P2010-191376

(51) Int. Cl.
*H04N 5/232* (2006.01)
*H04N 5/225* (2006.01)
(Continued)

(52) U.S. Cl.
CPC ..... *H04N 5/23293* (2013.01); *G06F 3/04845* (2013.01); *G06T 5/002* (2013.01);
(Continued)

(58) Field of Classification Search
CPC ............ H04N 5/45; H04N 21/42221; H04N 21/44008; H04N 21/4316; H04N 21/4221;
(Continued)

(56) References Cited

U.S. PATENT DOCUMENTS 4,249,213 A   2/1981 Imaide et al.
4,528,585 A   7/1985 Bolger
(Continued)

FOREIGN PATENT DOCUMENTS

CN   1637578 A   7/2005
JP   61-240789   10/1986
(Continued)

OTHER PUBLICATIONS

Search Report issued in corresponding European Application No. 11175649.0 dated Jun. 4, 2014.
(Continued)

*Primary Examiner* — Dramos Kalapodas
(74) *Attorney, Agent, or Firm* — Haug Partners LLP; William S. Frommer

(57) ABSTRACT

An imaging device includes: an image sensor that photoelectrically converts subject light to generate image signals; a storage portion that sets a second area within a first area so as to correspond to a specific area specified by a setting value for setting an extracting range of an image based on the image signals; a timing adjustment unit that adjusts the timing at which the image signals are read from the image sensor and written to the storage portion and the timing at which the image signals are read from the storage portion; an image conversion processor that performs predetermined processing on the image based on the image signals read from the image sensor; an output unit that converts processed image signals with continuous scanning timing into image signals of a predetermined format and outputs the image signals to a display unit.

19 Claims, 12 Drawing Sheets

Related U.S. Application Data continuation of application No. 13/215,996, filed on Aug. 23, 2011, now Pat. No. 9,088,702.

(51) Int. Cl.
  *G06F 3/0484* (2013.01)
  *G06T 5/00* (2006.01)
  *H04N 7/18* (2006.01)

(52) U.S. Cl.
  CPC ......... *H04N 5/225* (2013.01); *H04N 5/23229* (2013.01); *G06T 2207/10004* (2013.01); *G06T 2207/30252* (2013.01); *H04N 7/18* (2013.01)

(58) Field of Classification Search
  CPC ...... H04N 5/2628; H04N 7/185; H04N 7/141; H04N 7/14; H04N 7/15; H04N 7/147; H04N 7/142; H04N 7/144; H04N 7/157; H04N 21/4438; H04N 2005/4441; H04N 5/4401; H04N 5/44543; G06F 1/1601
  See application file for complete search history.

(56) References Cited

U.S. PATENT DOCUMENTS

| | | | |
|---|---|---|---|
| 4,984,083 A | 1/1991 | Okamoto et al. | |
| 5,289,284 A | 2/1994 | Ersoz et al. | |
| 5,500,654 A | 3/1996 | Fujimoto | |
| 5,537,157 A | 7/1996 | Washino et al. | |
| 5,745,711 A | 4/1998 | Kitahara | |
| 5,793,422 A | 8/1998 | Mochizuki et al. | |
| 5,815,199 A * | 9/1998 | Palm | H04N 5/217 348/143 |
| 5,959,555 A * | 9/1999 | Furuta | B60R 1/00 340/436 |
| 6,693,524 B1 * | 2/2004 | Payne | B60Q 9/005 340/431 |
| 6,801,127 B2 * | 10/2004 | Mizusawa | B60K 35/00 340/461 |
| 7,245,275 B2 * | 7/2007 | Okada | B60R 1/00 345/1.1 |
| 7,487,210 B2 * | 2/2009 | Ludwig | G06Q 10/10 709/204 |
| 7,849,393 B1 * | 12/2010 | Hendricks | H04N 5/4401 715/203 |
| 7,860,375 B2 | 12/2010 | Carlsgaard et al. | |
| 8,151,210 B2 * | 4/2012 | Nezu | B60K 35/00 382/104 |
| 2002/0001449 A1 | 1/2002 | Sato et al. | |
| 2002/0003571 A1 * | 1/2002 | Schofield | B60C 23/00 348/148 |
| 2002/0047895 A1 | 4/2002 | Bernardo | |
| 2003/0095182 A1 | 5/2003 | Imoto | |
| 2005/0012685 A1 * | 1/2005 | Okada | B60R 1/00 345/32 |
| 2005/0036068 A1 | 2/2005 | Shin | |
| 2005/0053274 A1 | 3/2005 | Mayer et al. | |
| 2005/0083405 A1 | 4/2005 | Imoto et al. | |
| 2006/0017807 A1 * | 1/2006 | Lee | B60R 1/00 348/36 |
| 2006/0187238 A1 * | 8/2006 | Yoneji | B60R 1/00 345/629 |
| 2008/0060034 A1 | 3/2008 | Egnal et al. | |
| 2008/0297586 A1 * | 12/2008 | Kurtz | H04N 7/147 348/14.08 |
| 2008/0298571 A1 * | 12/2008 | Kurtz | H04N 7/142 379/156 |
| 2009/0034941 A1 | 2/2009 | Kageyama et al. | |
| 2009/0041378 A1 | 2/2009 | Yamaoka | |
| 2009/0225224 A1 | 9/2009 | Sung et al. | |
| 2009/0225432 A1 | 9/2009 | Toyoda | |
| 2009/0284620 A1 | 11/2009 | Lablans | |
| 2009/0303351 A1 | 12/2009 | Ogawa | |
| 2010/0020176 A1 | 1/2010 | Higashibara | |
| 2010/0097526 A1 | 4/2010 | Jacob | |
| 2011/0043669 A1 * | 2/2011 | Ishida | H04N 5/23238 348/264 |
| 2011/0221764 A1 * | 9/2011 | Callens | G06F 9/451 345/625 |
| 2012/0044372 A1 | 2/2012 | Cote et al. | |
| 2012/0140043 A1 | 6/2012 | Mori | |
| 2014/0226952 A1 * | 8/2014 | Cilia | H04N 5/247 386/226 |

FOREIGN PATENT DOCUMENTS

| | | |
|---|---|---|
| JP | 07-234773 | 9/1995 |
| JP | 2001-006097 | 1/2001 |
| JP | 2002-19556 | 1/2002 |
| JP | 2002-311939 | 10/2002 |
| JP | 2002-325249 | 11/2002 |
| JP | 2009-010455 | 1/2009 |
| JP | 2010-033108 | 2/2010 |
| JP | 2010-33108 | 2/2010 |

OTHER PUBLICATIONS

Japanese Office Action dated Jun. 3, 2014.
Office Action issued in corresponding Chinese application No. 2011102445006 dated Jun. 30, 2015 and the English Translation.
Chinese First Office Action dated May 25, 2018.
European Office Action dated Apr. 17, 2019.

* cited by examiner

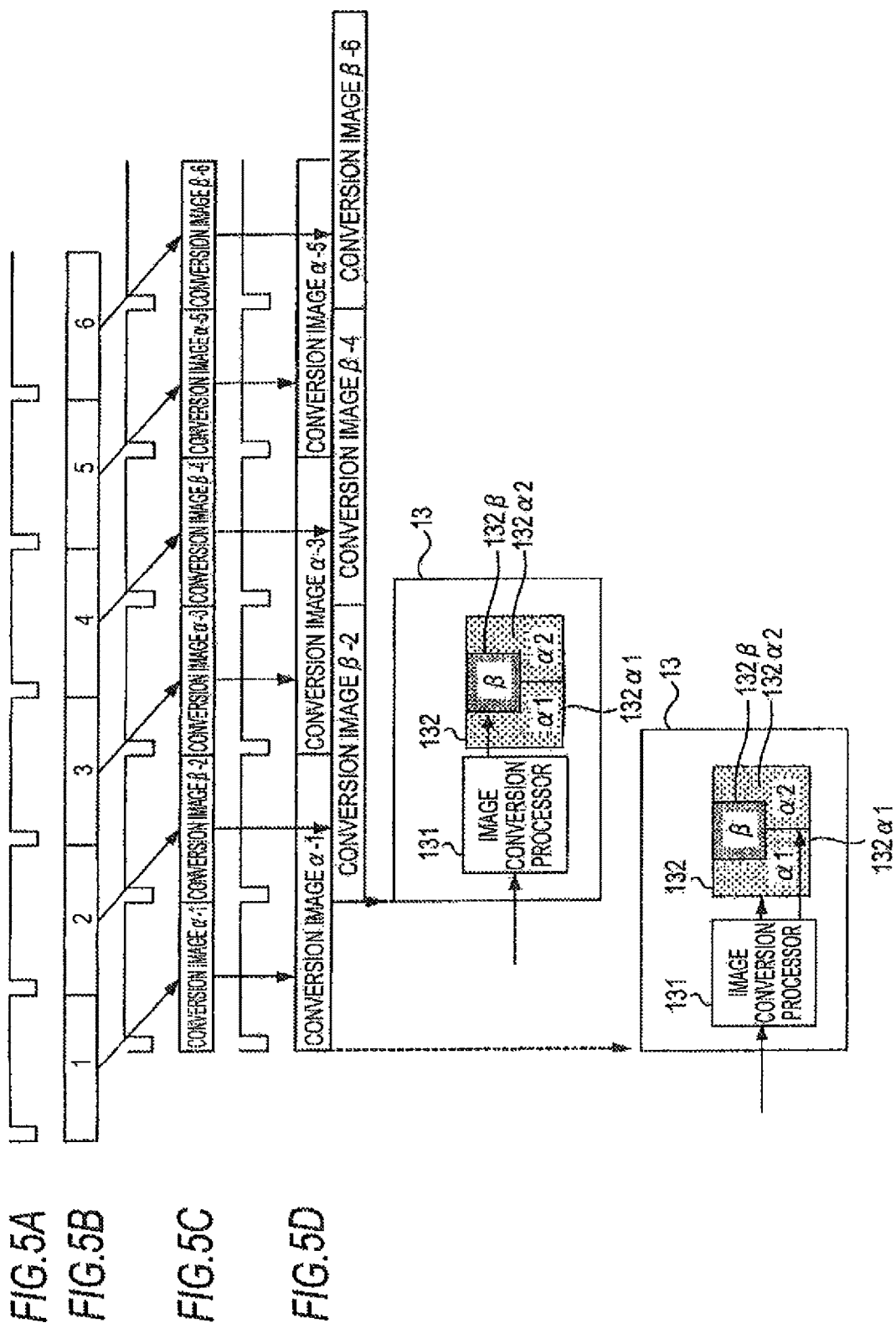

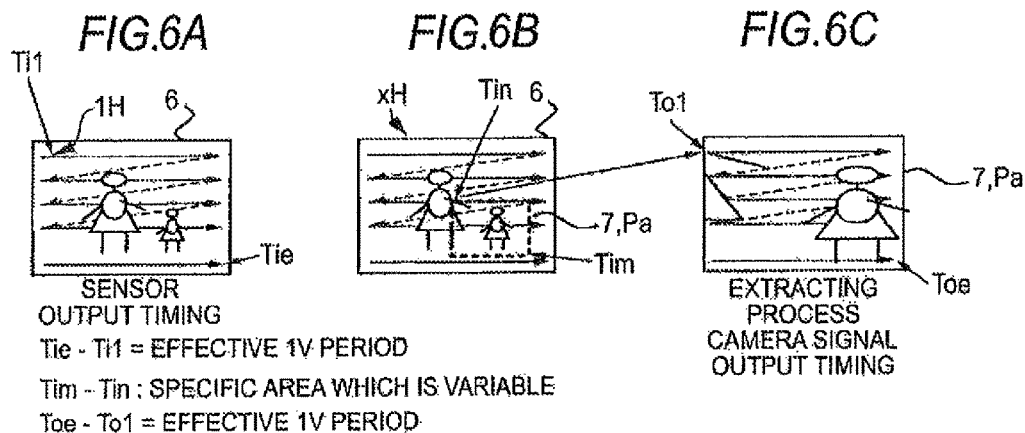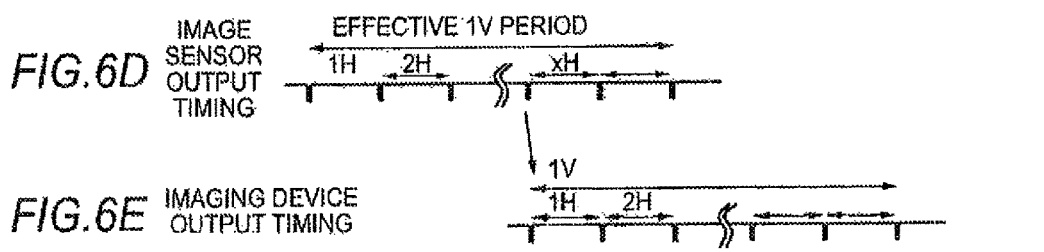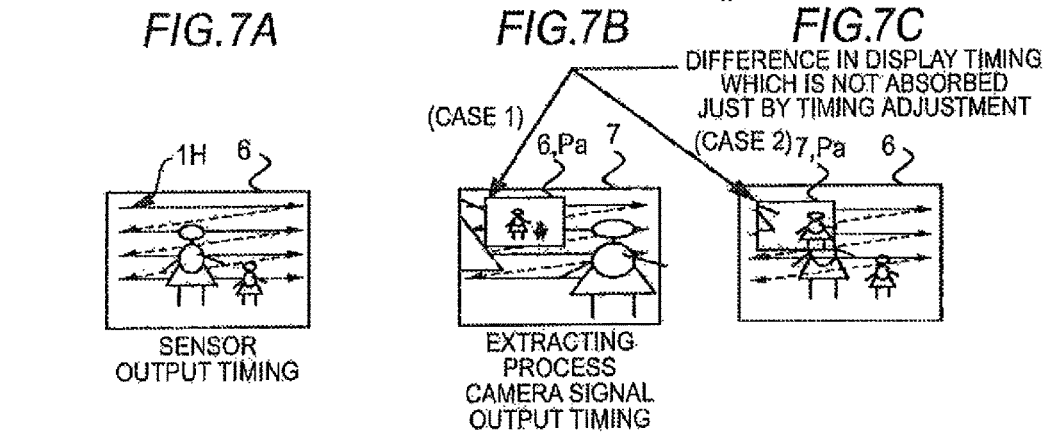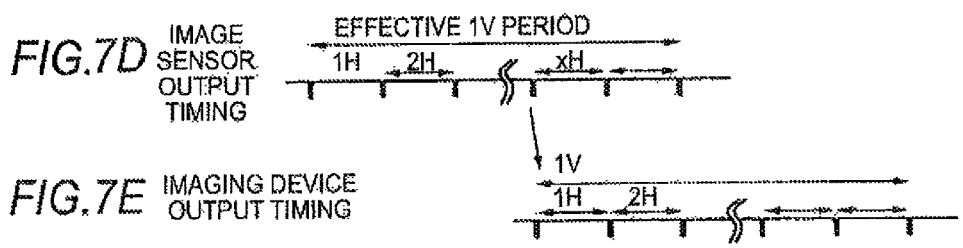

TIMING ADJUSTMENT WHEN PARTIAL IMAGE
IS DISPLAYED IN ENLARGED SCALE IN PINP MODE (CASE 1)

SENSOR
OUTPUT TIMING

Tie - Ti1 = EFFECTIVE 1V PERIOD

Tim - Tin = SPECIFIC AREA WHICH IS VARIABLE

Tpe - Tp1 = VARIABLE DEPENDING ON DISPLAY POSITION

Toe - To1 = EFFECTIVE 1V PERIOD

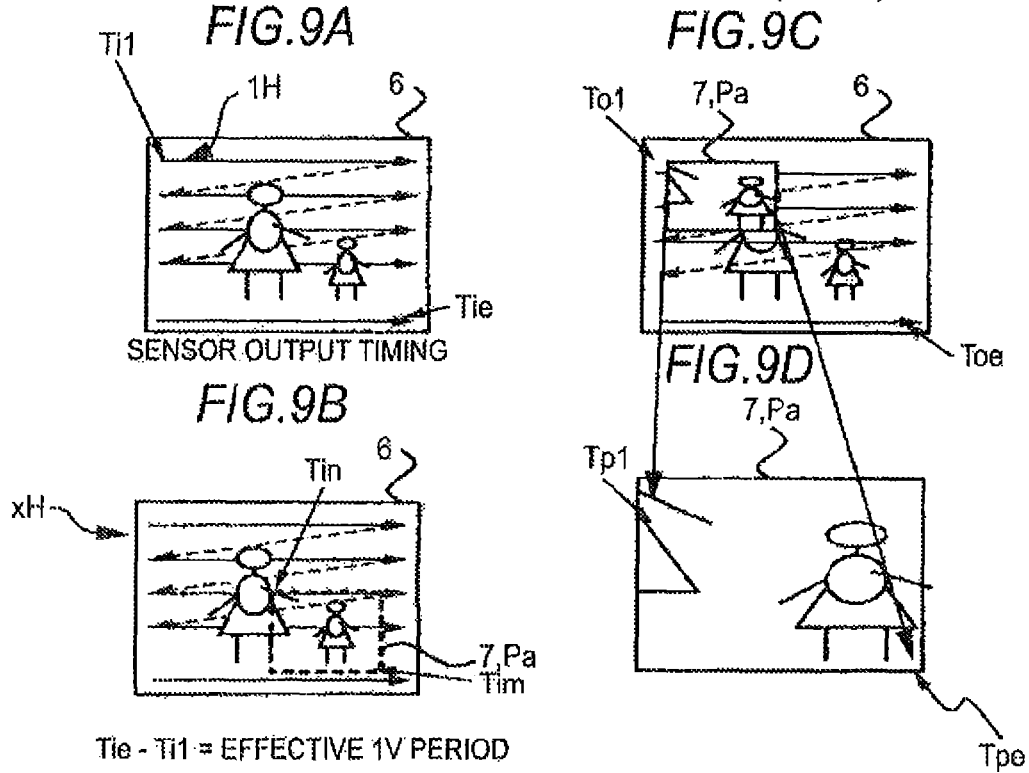
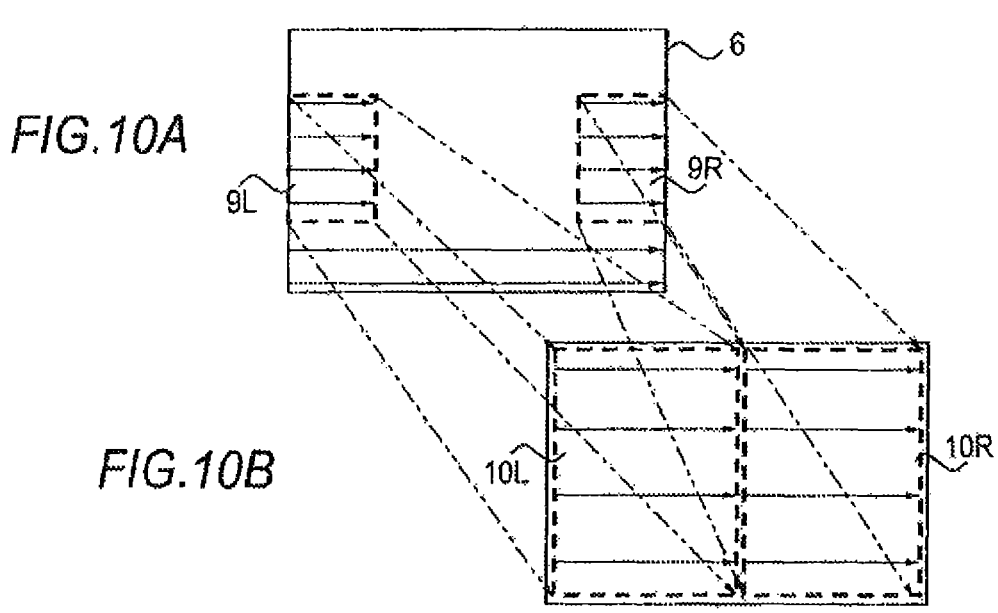

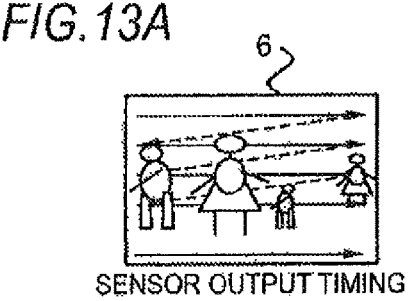
FIG.13A
SENSOR OUTPUT TIMING
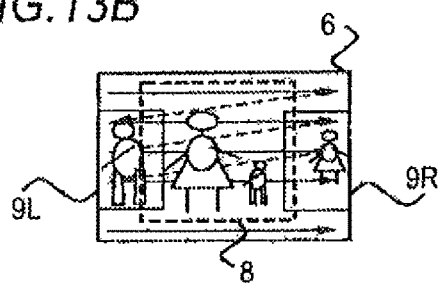
FIG.13B
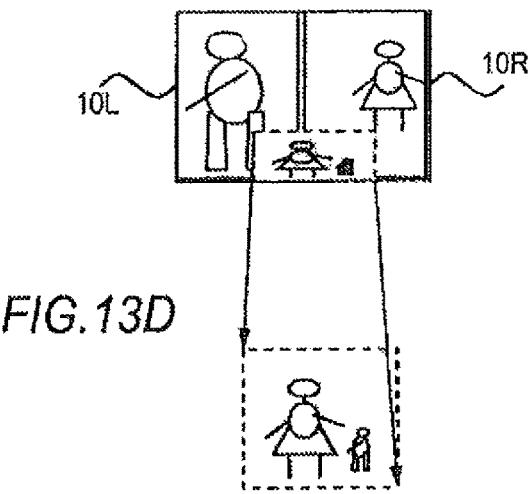
FIG.13C
FIG.13D
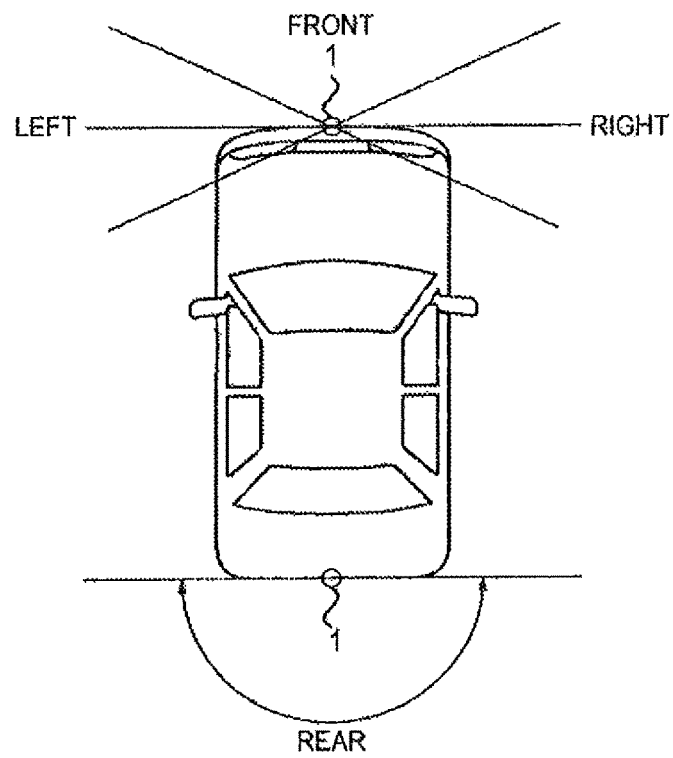
FIG.14

IMAGING DEVICE, IMAGING SYSTEM, AND IMAGING METHOD

This is a continuation of application Ser. No. 14/744,684, filed Jun. 19, 2015, which is a continuation of application Ser. No. 13/215,996, filed Aug. 23, 2011, now U.S. Pat. No. 9,088,702, issued Jul. 21, 2015, with a claim of priority under 35 USC 119 to Japanese Application No. 2010-191376, filed in Japan on Aug. 27, 2010, the entirety of which is incorporated herein by reference.

FIELD

The present disclosure relates to an imaging device, an imaging system, and an imaging method which are ideally used in an in-vehicle camera that captures and displays images of areas that are difficult for a driver, for example, of an automobile to see.

BACKGROUND

In the related art, techniques of displaying images captured by a compact camera mounted in an automobile vehicle, a railroad vehicle, or the like on a display device installed, for example, near the driver's seat are known (for example, see JP-A-2002-19556 and JP-A-2010-33108). By capturing the images of areas that are difficult for the driver to see during driving using such a camera and displaying the captured images on a display device, such areas can be changed to areas that are visible to the driver. For example, in the case of automobile vehicles, the rear or the like of a vehicle is often set as the areas that are difficult for drivers to see taking a case in which the vehicle moves backward to park into consideration. Moreover, at the intersections of a narrow road, it is difficult to recognize vehicles approaching from the left and right sides.

Moreover, an imaging system which uses a monitoring device that captures and displays images output by a plurality of cameras in order to display the surroundings of a vehicle is known. This imaging system enhances the visibility of a plurality of images using a PinP (Picture in Picture) presentation function of displaying images captured in different directions on the same monitor screen. Another in-vehicle imaging system is known which converts and combines parts of a whole image using an ECU (Electronic Control Unit) or the like for processing images output by a camera to thereby perform a PinP presentation using a function of arranging separate screen areas within a screen. In this imaging system, after the images output by the camera are taken into an image memory of the ECU through wiring harness, the plurality of transmitted images are combined together. Thus, the definition of images displayed on an in-vehicle monitor depends on the bandwidth of the transmission system. Therefore, the images are taken into the image memory of the ECU and the conversion images are combined together in a state where the resolution of the transmitted images is decreased.

FIG. 18 shows an example of an image 100 of the surroundings of a vehicle, captured with an in-vehicle camera of the related art.

In the related art, a camera system is known in which an in-vehicle camera is disposed on the front of a vehicle to display the video on the left and right sides of the vehicle to a display unit so that the user can observe the areas on the left and right sides of the vehicle as well as on the front side. Moreover, a camera system is known in which a camera uses an anamorphic lens or the like of which the optical axis of a lens is designed to be asymmetrical so that the user can observe the areas on the left and right sides of a vehicle as well as on the front side. In the former camera system, the images captured by three cameras disposed on the front and the left and right sides of the vehicle are taken, and the images are combined and displayed by an image presentation function used in a camera control ECU or a navigation system.

SUMMARY

However, when driving a vehicle across a road at a right angle or pulling the vehicle out from a parking garage, it may be difficult for the driver to observe other vehicles or pedestrians approaching from the left and right sides from the driver's seat. Since an in-vehicle camera mounted on a vehicle needs to capture a wide range of areas, a fish-eye lens, an anamorphic lens, and the like are used. Thus, if an image captured by these lenses is displayed as it is, since objects located at the periphery of the image are displayed in a small scale, the driver may overlook dangerous objects or obstacles during driving.

Moreover, in the imaging system of the related art, it is necessary to attach a plurality of cameras to the left, right, front, and rear sides of a vehicle. Furthermore, separate image combination processors are needed to combine the images captured by the respective cameras. Thus, constructing an imaging system incurs a lot of effort and is expensive, and such a system is not widely used. In addition, when a camera is configured by combining a plurality of lenses, the lens system has a complex configuration, and the camera becomes expensive and large. Thus, the mounting position of the camera is limited. Furthermore, the use of a wide-angle camera of the related art to just display a wide-angle image has a problem in that it is difficult for the driver to sense the distance to an approaching vehicle due to a large distortion of the wide-angle camera. Therefore, it is very dangerous for the driver to drive the vehicle trusting the visually sensed distance since it is far different from the actual distance.

Moreover, in the imaging system of the related art, since the image definition is determined by the transmission capacity of the harness, the image definition will decrease when the image is enlarged by the ECU disposed at the rear stage of the camera. Furthermore, since the ECU needs to take all images transmitted from the camera into a memory once, it is necessary to mount components for image combination as well as components for image storage on the imaging system. Therefore, the number of components needed for constructing an imaging system increases, making the imaging system complex and expensive.

It is therefore desirable to enable a driver (user) to easily see images captured from the left and right directions in relation to a moving direction together with an image of a local area that the driver focuses on with a particular attention on the same screen at the same time.

In an embodiment of the present disclosure, subject light is photoelectrically converted to generate image signals.

A second area is set within a first area in a storage portion so as to correspond to a specific area specified by a setting value for setting an extracting range of an image based on the image signals.

The timing at which the image signals are read from the image sensor and the image signals are written to the storage portion and the timing at which the image signals are read from the storage portion are adjusted.

Then, predetermined processing on the image based on the image signals read from the image sensor is performed. The frame rate of writing the image signals is changed in units of frames by the adjusted timing, and a one-directional image signal corresponding to an image obtained by imaging in one direction, among the image signals input from the image sensor is written to the second area in a predetermined frame period. On the other hand, a left-directional image signal corresponding to an image obtained by imaging the left side of the one direction is written to a first split area split from the first area in a frame period different from the frame period of the one-directional image signal. A right-directional image signal corresponding to an image obtained by imaging the right side of the one direction is written to a second split area split from the first area in a frame period different from the frame period of writing the left-directional image signal to the first split area.

The one-directional image signal, the left-directional image signal, and the right-directional image signal read from the first and second areas in accordance with continuous scanning timing are converted into image signals of a predetermined format and outputting the image signals to a display unit.

With this configuration, by appropriately arranging and storing image signals in the storage portion, it is possible to store image signals read from the image sensor in one storage portion and output the one-directional image signal, the left-directional image signal, and the right-directional image signal from the storage portion as they are in synchronization with the continuous scanning timing.

According to the embodiment of the present disclosure, the imaging device has a function of arranging a child screen within an image output by the imaging device having a PinP function and output the child screen to the display unit. In the child screen, an image based on the one-directional image signal is displayed. Moreover, in a screen excluding the child screen, the left and right-side images based on the right-directional image signal and the left-directional image signal are displayed. In this way, when monitoring the surroundings using a wide-angle image, the user can observe the areas in the horizontal direction as well as the area in the one direction at the same time by looking at the same screen. Moreover, by improving the visibility, the driver can detect the situation of the surrounding environment of the driver's vehicle at an early stage.

BRIEF DESCRIPTION OF THE DRAWINGS

FIGS. 5A to 5D are views illustrating an example of an image conversion process by an image conversion processor according to an exemplary embodiment of the present disclosure.

FIGS. 6A to 6E are views illustrating an example of a process by a timing adjustment unit according to an exemplary embodiment of the present disclosure.

FIGS. 7A to 7E are views showing an example of timing adjustment when displaying a partial image in an enlarged scale in a PinP mode in an exemplary embodiment of the present disclosure.

FIGS. 9A to 9D are views illustrating an example (second case) of timing adjustment when displaying a partial image in an enlarged scale in a PinP mode in an exemplary embodiment of the present disclosure.

FIGS. 10A and 10B are views illustrating an example of enlarging the left and right images in both vertical and horizontal directions in an exemplary embodiment of the present disclosure.

FIGS. 13A to 13D are views illustrating an example when a partial image is displayed in an enlarged scale in a PinP mode in an exemplary embodiment of the present disclosure.

FIG. 14 is an exemplary top view of an automobile in which an imaging device according to an exemplary embodiment of the present disclosure is installed.

DETAILED DESCRIPTION

Hereinafter, modes for carrying out the present disclosure (hereinafter also referred to as a present embodiment) will be described. The description will be given in the following order.

1. Exemplary Embodiment (PinP Presentation Control: Example of Controlling PinP Presentation using One Image Storage Portion); and 2. Modified Example 1. Exemplary Embodiment

[Exemplary Overall Configuration of Imaging System]

Figure 1:
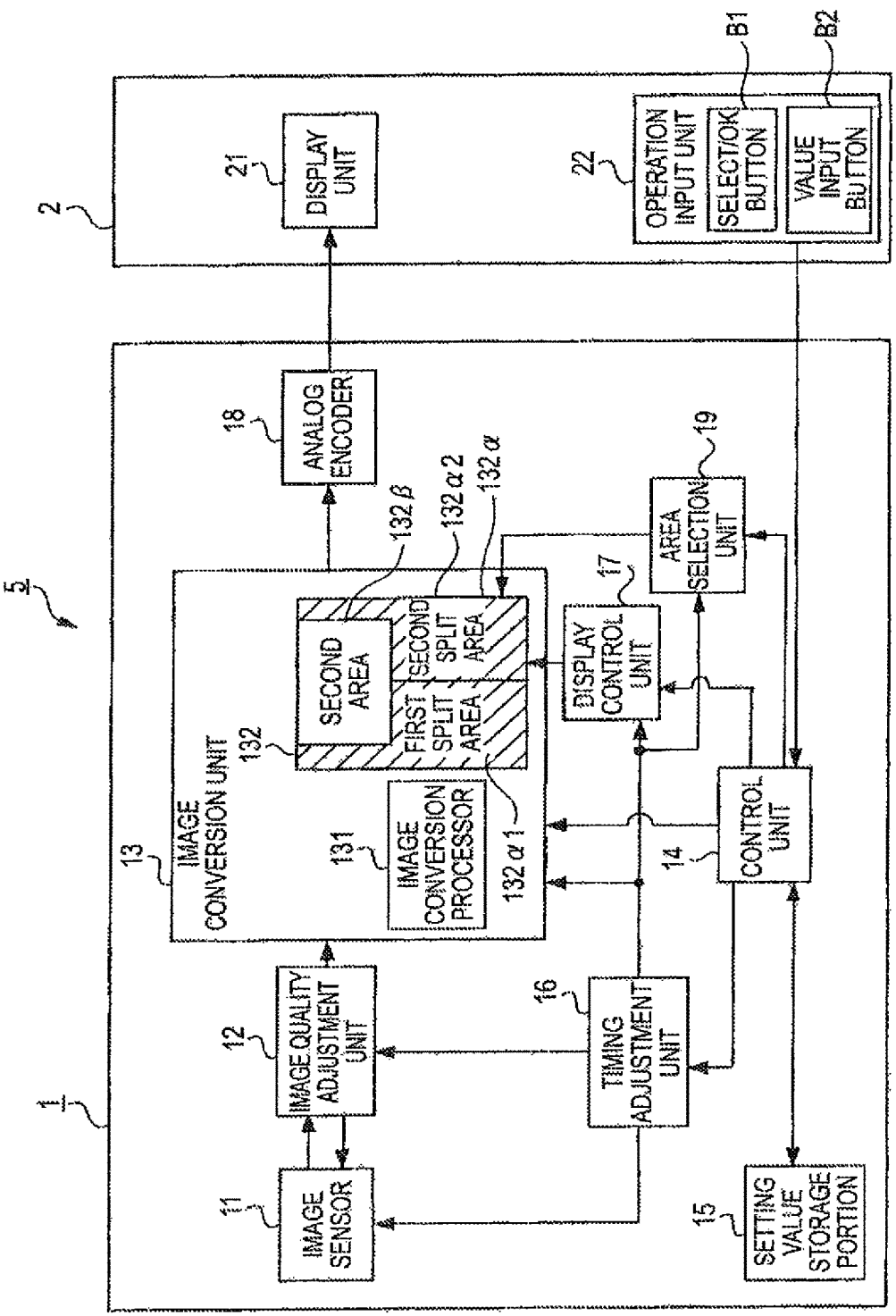
FIG. 1 is a block diagram showing an exemplary internal configuration of an imaging device and a display device according to an exemplary embodiment of the present disclosure.

FIG. 1 shows an exemplary configuration of an imaging device 1 and a display device 2 as an exemplary embodiment of an imaging system 5 according to the present disclosure. In the present embodiment, a case in which the imaging device 1 is applied to an in-vehicle camera attached to the rear of an automobile vehicle (not shown), and the display device 2 is applied to a display device of a car navigation system or the like mounted in the vehicle will be described as an example. The imaging device 1 and the display device 2 are connected by a cable or the like (not shown) whereby the imaging system 5 is formed in which image signals are input from the imaging device 1 to the display device 2, and control signals are input from the display device 2 to the imaging device 1.

In the present embodiment, although an example in which the imaging device 1 is mounted on an automobile is illustrated, the mounting destination is not limited to this. That is, the imaging device 1 according to the embodiment of the present disclosure may be mounted on a railroad vehicle and the body of a vehicle or a ship's hull as a vehicular machine such as, heavy equipment (for example, a movable crane car), an industrial machine, or a yacht.

First, the constituent elements of the display device 2 will be described. The display device 2 includes a display unit 21 and an operation input unit 22. The display unit 21 is configured, for example, by an LCD (Liquid Crystal Display) or the like and is configured to display image signals transmitted from the imaging device 1 as an image. The operation input unit 22 generates control signals in accordance with the content of a button operation by a user pressing a Select/OK button B1 for selecting display screen settings and supplies a setting value for an image to be selected by the imaging device 1 to a control unit 14.

The operation input unit 22 further includes a value input button B2 independent from the Select/OK button B1. With the value input button B2, the images of "local areas that the user focuses on with particular attention" are selected and set in accordance with the content of a button operation by the user, and a unique presentation mode is set in advance and stored. By doing so, the unique presentation mode can be invoked by a simple operation of pressing the Select/OK button B1 as necessary. Hereinafter, this presentation mode set in advance by this display method will be referred to as a "personal view mode".

In particular, when the user long-presses the Select/OK button B1 and the value input button B2 at the same time, the operation input unit 22 generates an interrupt request signal to the imaging device 1 so as to transit to a setting menu screen for "personal view mode". On this setting menu screen, the user presses the Select/OK button B1 and the value input button B2 continuously (this button operation is a first command input) to thereby generate control signals, whereby an extracting position and control setting values necessary for partial enlargement are determined and stored in a setting value storage portion 15. Moreover, the determined position and setting values are supplied to the imaging device 1, and setting necessary for the unique presentation in "personal view mode" is performed.

Moreover, when the pressing of the Select/OK button B1 is detected, the imaging device 1 in which the "personal view mode" is set by the described method performs the following processes. That is, this button operation is regarded as a second command input. Moreover, a control signal to read the image of a area set as the "personal view mode" is generated.

Although the "personal view mode" is an example of a presentation mode for making blind areas unique to the user easier to see, areas which are registered in advance when designing or manufacturing an imaging device may be set and displayed in a PinP format.

Although in the example shown in FIG. 1, the display device 2 includes the display unit 21 and the operation input unit 22 as separate units, a display device that uses a touch panel or the like in which the display unit 21 and the operation input unit 21 are integrated may be used.

Next, constituent elements of the imaging device 1 will be described. The imaging device 1 includes an image sensor 11, an image quality adjustment unit 12, an image conversion unit 13, a control unit 14, a setting value storage portion 15, a timing adjustment unit 16, a display control unit 17, an analog encoder (output unit) 18, and an area selection unit 19.

The image sensor 11 is configured by a solid-state imaging device. As the image sensor 11, a CCD (Charge Coupled Device) image sensor, a CMOS (Complementary Metal Oxide Semiconductor) image sensor, and the like can be used, for example. The image sensor 11 generates image signals by photoelectrically converting subject light condensed by a wide-angle lens (not shown) disposed near the body of a vehicle or a ship's hull on which the imaging device 1 is mounted. The image signals obtained by the image sensor 11 are supplied to the image quality adjustment unit 12. The image quality adjustment unit 12 converts the supplied image signals into digital image signals and performs image quality adjustment. As the image quality adjustment, AGC (Automatic Gain Control), noise reduction, image quality enhancement, and the like are performed, for example. The image quality adjustment unit 12 controls the driving of the image sensor 11. Moreover, the image quality adjustment unit 12 adjusts the image qualities of images made up of a one-directional image signal, a left-directional image signal, and a right-directional image signal which are to be written in first and second areas 132α and 132β described later in accordance with the timing at which the image signals are taken from the image sensor 11 in units of frames. In this case, the respective directional images are controlled to have different image qualities. The timing is determined based on a readout timing signal supplied from the timing adjustment unit 16. The image signals of which the image qualities are adjusted by the image quality adjustment unit 12 are supplied to the image conversion unit 13.

The image conversion unit 13 is configured to include an image conversion processor 131 and an image storage portion 132 and is configured to convert the image format into a standard output format, for example, the NTSC format. The image storage portion 132 includes a first area 132α for storing a first image signal corresponding to a whole image based on the image signals input from the image sensor 11 and a second area 132β for storing a second image signal corresponding to a partial image which is a part of the whole image. Moreover, the first area 132α is split into two areas, which are a first split area 132α1 for storing a left-directional image signal among the first image signal and a second split area 132α2 for storing a right-directional image signal.

In the present embodiment, a "one-directional image signal" obtained by imaging an area in one direction in which the lens of the imaging device 1 faces is used as the second image signal. Moreover, a "left-directional image signal" obtained by imaging the left side of the one direction and a "right-directional image signal" obtained by imaging the right side of the one direction are collectively used as the first image signal. The image storage portion 132 sets the second area 132β within the first area 132α so as to correspond to a specific area specified by a setting value generated by the control unit 14 that sets an extracting range of the image based on the image signals. Moreover, the first area 132α is set in a portion of the image storage portion 132 excluding the second area 132β.

In the imaging device 1, the first and second areas 132α and 132β are provided in the image storage portion 132, and the area selection unit 19 is provided so as to select an area to which image signals are to be written. A conversion image to be displayed on the entire screen of the display unit 21 is stored in the first area 132α, and a conversion image to be displayed in a small PinP screen is stored in the second area 132β. By continuously reading out images in the image storage portion 132 in accordance with the frame output timing, the images of the PinP format can be output in a standard output format.

Specifically, the image conversion processor 131 extracts an image of a specific area within the image based on the image signals supplied from the image quality adjustment unit 12 based on the control of the control unit 14. Moreover, the extracted image is enlarged to an image having the size corresponding to the full screen of the display unit 21 of the display device 2. In this case, the image conversion processor 131 performs predetermined processing on the image based on the image signals read from the image sensor 11. Moreover, the image conversion processor 131 writes image signals to the second area 132β while changing the frame rate of writing image signals in units of frames by the adjusted timing. This adjustment is performed on the one-directional image signal corresponding to the image obtained by imaging an area in one direction among the image signals input from the image sensor.

Moreover, the image conversion processor 131 writes the left-directional image signal corresponding to the image obtained by imaging the left side of the one direction in the first split area 132α1 split from the first area 132 in a frame period different from the frame period of the one-directional image signal. Furthermore, the image conversion processor 131 writes the right-directional image signal corresponding to the image obtained by imaging the right side of the one direction in the second split area 132α2 split from the first area 132α in a frame period different from the frame period when images are written to the first split area 132α1. Image signals different from the image signals written to the first area are written in a subsequent frame period and in synchronization with time-sequential frame readout timing. The extracted and enlarged images are output to the image storage portion 132. The image storage portion 132 also serves as a frame memory for maintaining the image signals supplied from the image conversion processor 131 for a predetermined period.

As described above, the imaging device 1 includes the image conversion unit 13 which has a function of generating and outputting conversion images from a wide-angle image and which stores an image of a partial designated area to be embedded in a part of an image area necessary for outputting the whole image. Since the image taken from the image sensor 11 through the wide-angle lens (not shown) of the imaging device 1 has a lot of distortion, the image conversion unit 13 processes the image signals to correct the distortion. In this case, the specific areas that are desired to be displayed in an enlarged scale are enlarged and individually inserted into a designated address area as a child screen of an output image and are maintained in the second area 132β used as a buffer memory. Moreover, the image is output together with an embedded image in the rear stage of the camera during frame update, whereby the PinP function is realized.

The control unit 14 is configured, for example, by an MPU (Micro-Processing Unit) or the like. The control unit 14 generates the setting value for "personal view mode" defined by the "first command input" that specifies the range of "specific area" based on the size and position of a frame in accordance with the content of the control signal input from the operation input unit 22 and stores the setting value in the setting value storage portion 15. That is, the setting value serves as a setting value that designating the extracting range of the image based on the image signal supplied from the image quality adjustment unit 12. The setting value includes a zoom factor when zooming the specific area and XY coordinates of the specific area. Moreover, the control unit 14 includes a counter for counting the number of pressings of the value input button B2 of the display device 2 and a timer for measuring time.

Upon receiving the second command input from the operation input unit 22, the control unit 14 reads the setting value from the setting value storage portion 15 and outputs the setting value to the image conversion unit 13. Moreover, the control unit 14 generates a control signal for adjusting the output timing of image signals from the image sensor 11 and the output timing of image signals from the image storage portion 132 and supplies the control signal to the timing adjustment unit 16. Furthermore, the control unit 14 generates a control signal for outputting the image signals converted by the image conversion processor 131 to the analog encoder 18 and supplies the control signal to the image conversion processor 131.

The area selection unit 19 and the timing adjustment unit 16 adjust the timing of reading image signals from the image sensor 11 and writing the same in the image storage portion 132 and the timing of reading image signals from the image storage portion 132 based on the control signal supplied from the control unit 14. The details of the processes of the timing adjustment unit 16 will be described with reference to FIGS. 6A to 6E.

The display control unit 17 reads images stored in the image storage portion 132 and outputs the same to the analog encoder 18 in accordance with the timing adjusted by the timing adjustment unit 16 based on the control signal supplied from the control unit 14. Moreover, the display control unit 17 generates a frame line or the like for setting the specific area and outputs the same to the analog encoder 18. In this case, the display control unit 17 displays a frame of which the size and position are varied in accordance with the operation input from the user on the display unit 21 for displaying images based on image signals output by an output unit. Moreover, the display control unit 17 displays an image extracted as the specific area in the child PinP screen. Furthermore, although an example in which the display control unit 17 displays the image extracted as the specific area in the full PinP screen and displays the whole image in the child PinP screen is illustrated, the output PinP screens may be set in the opposite manner.

The analog encoder 18 reads the one-directional image signal, the left-directional image signal, and the right-directional image signal from the first area 132α (the first and second split areas 132α1 and 132α2) and the second area 132β in accordance with continuous scanning timing. Moreover, the analog encoder 18 converts and outputs the image signals (the one-directional image signal, right-directional image signal, and left-directional image signal) into image signals of a predetermined format in a state where the whole image and the partial images are associated with each other. This format may be the NTSC (National Television System Committee) format, for example, and the analog encoder 18 supplies the image signals to the display unit 21 of the display device 2. The timing adjustment unit 16 adjusts the image output timing so that images can be output in synchronization with the V Sync signal of the NTSC output timing regardless of whether images are extracted or not. This adjustment is performed in order to adjust the timing of reading images from the image sensor 11 and outputting conversion images by delaying the entire image frame.

Figure 2:
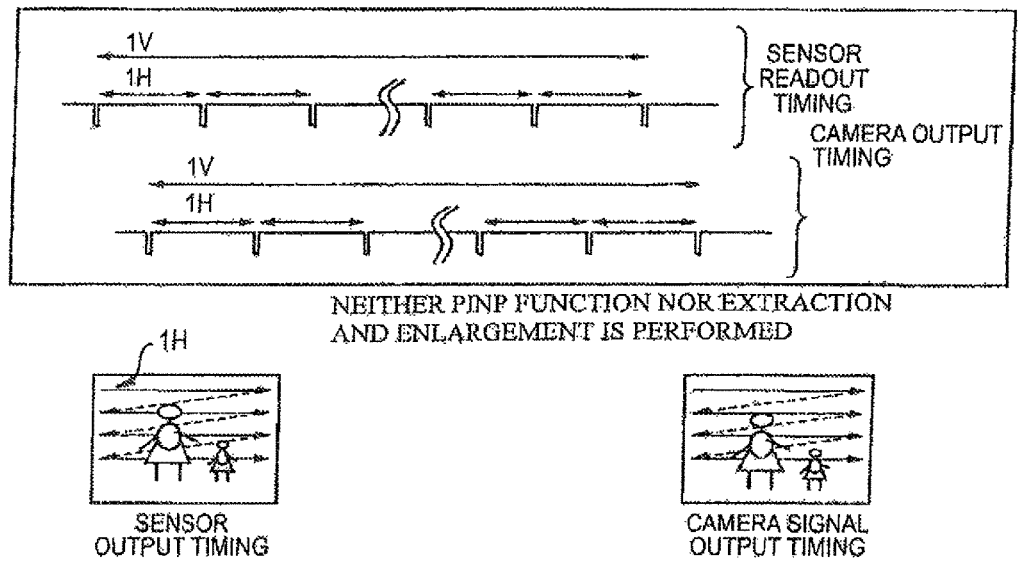
FIG. 2 is view illustrating examples of the timing at which an image sensor of the related art reads out image signals and the timing at which an imaging device of the related art outputs image signals.

FIG. 2 shows examples of the timing at which an image sensor of the related art reads out image signals and the timing at which an imaging device of the related art outputs image signals.

In this example, a case in which the imaging device 1 of the related art does not perform conversion for correcting image distortion, the PinP presentation mode, extracting and enlarging of partial images, and the like will be described.

The image sensor reads one line of image signals in each horizontal period (1H). All horizontal lines in the imaging area of the image sensor are read during one vertical period (1V). Images taken from the image sensor 11 are output to the outside of the imaging device as they are without being subjected to image size conversion or the like.

An image storage portion of the imaging device of the related art does not have the first and second areas 132α and 132β corresponding to the image storage portion 132 of the present embodiment. Here, since the image quality adjustment unit and the image conversion unit performs predetermined processing, respectively, the timing at which the imaging device 1 outputs image signals is generally delayed by the same amount. As a result, it is not necessary to perform timing adjustment for each local image area.

Figure 3:
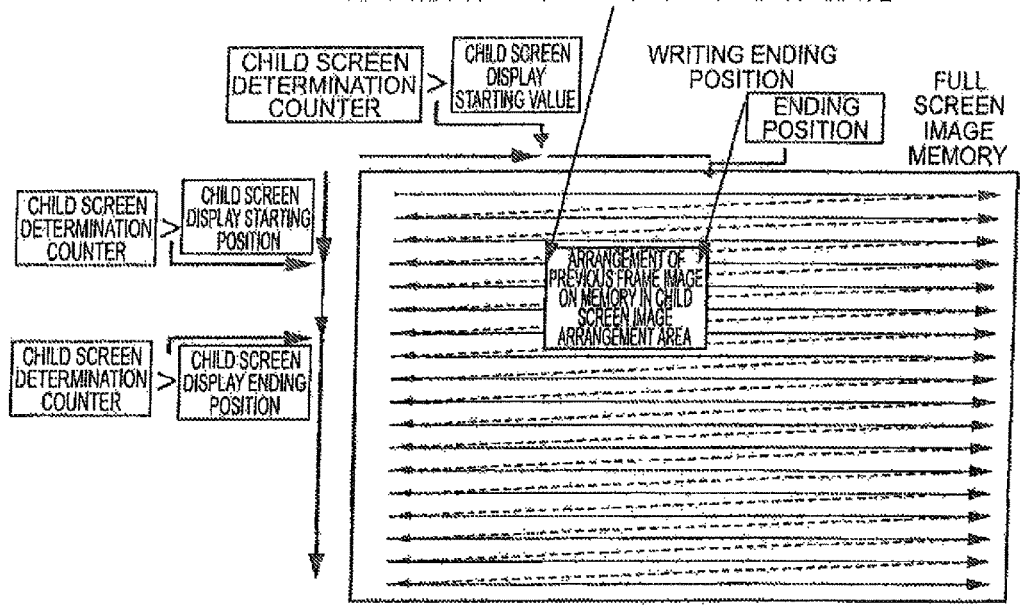
FIG. 3 is a view illustrating an example of images disposed in a first area and a second area.

FIG. 3 shows an example of images disposed in the first and second areas 132α and 132β.

A conversion image to be displayed on the entire screen of the display unit 21 is stored in the first area 132α, and a conversion image to be displayed in a small PinP screen is stored in the second area 132β. In the following description, the full screen of the display unit 21 will be referred to as a "main screen" and an area in which a partial image is displayed will be referred to as a "child screen". The image conversion unit 13 already knows the range of areas in the horizontal and vertical directions of the child screen.

Whenever one line of images processed by the image conversion processor 131 are written to the image storage portion 132, the image conversion unit 13 calculates the starting and ending positions at which the child screen is displayed and writes the image signal of the child screen to the second area 132β in units of lines. Here, writing of image signals to the first and second areas 132α and 132β is performed based on the value of a child screen determination counter (not shown) of the image conversion unit 13. The child screen determination counter is a counter that counts image signals written in the horizontal direction for each pixel and counts image signals written in the vertical direction for each line.

Since the writing is also performed in the vertical direction, the image signal of the child screen is written to the second area 132β if the value of the child screen determination counter is larger than the line corresponding to the display starting position of the child screen. Moreover, the writing to the second area 132β ends if the value of the child screen determination counter is larger than the display ending position of the child screen. Here, the image signal written to the first area 132α is an image signal of the present frame, whereas the image signal written to the second area 132β is an image signal of the previous frame. A process of outputting image signals of the present and previous frames by splitting one image storage portion 132 into two area will be described with reference to FIGS. 4A to 4C and FIGS. 5A to 5D.

Figure 4A:
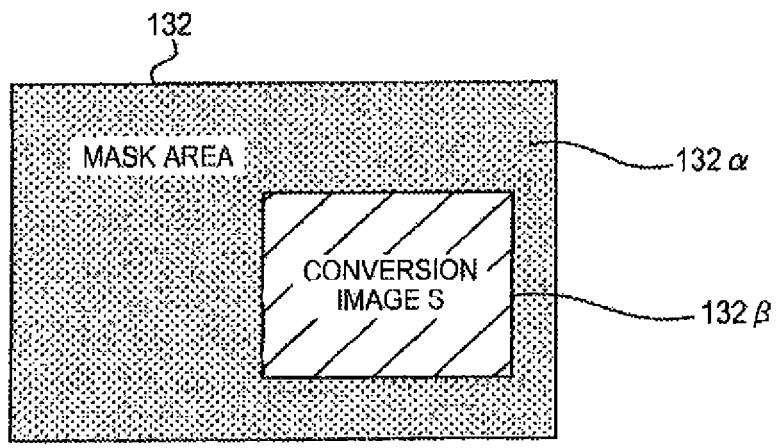
FIGS. 4A to 4C are views showing examples of a process of writing a conversion image in first and second areas.
Figure 4B:
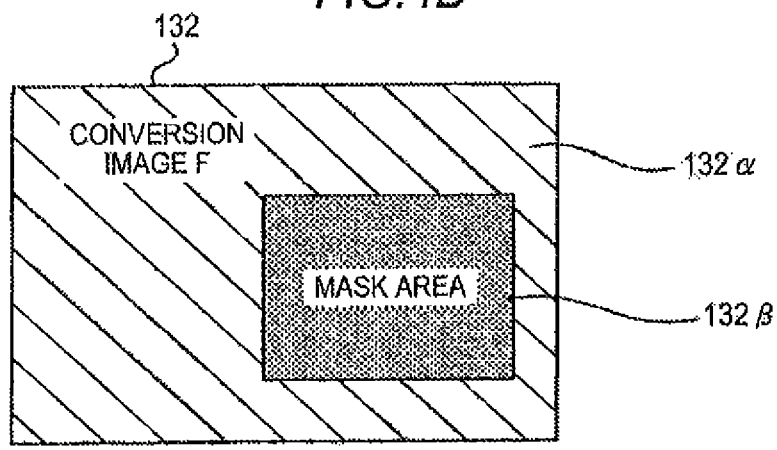
Figure 4C:
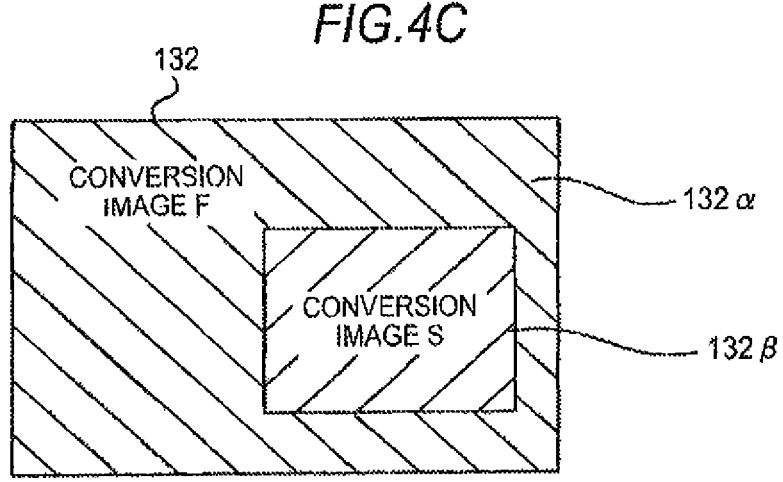

FIGS. 4A to 4C are views showing examples of a process of writing a conversion image in first and second areas 132α and 132β.

First, as shown in FIG. 4A, a conversion image S to be displayed in a small PinP screen is written to the second area 132B. The first area 132α is a mask area in which no image is written. Subsequently, as shown in FIG. 4B, a conversion image F to be displayed in the full screen is written to the first area 132α. In this case, the second area 132β is a mask area in which no image is written.

Then, the area selection unit 19 causes the full screen conversion image F and the small screen conversion image S which are written in this way to be alternately output from the analog encoder 18 in units of frames while decreasing the frame rate by ½. That is, the respective conversion images are updated every two frames. By performing such a process, as shown in FIG. 4C, the full screen conversion image F and the small screen conversion image S which are images obtained at different times are combined and output.

With such a configuration, it is possible to display an image captured in the normal mode on the full screen of the display unit 21, for example, and display an image of a specific area Pa (see FIG. 6A) based on the personal view mode in the small PinP screen. By outputting the images of both areas in each output frame, the user can observe an enlarged image of the specific area Pa while looking at the normal image captured by the imaging device 1. Thus, the user can easily understand the situation of the surroundings of the vehicle. Moreover, according to the configuration of the present embodiment, it is not necessary to provide a plurality of image storage portions 132 so as to correspond to the number of areas without using a device for generating and combining PinP images at the outside of the imaging device 1 and additional memories necessary for this operation. Therefore, it is possible to decrease the number of components of a vehicle surrounding monitoring system configured by the imaging device 1 and the display unit 21 and to decrease the cost of the system.

[Exemplary Image Conversion Process by Image Conversion Processor 131]

FIGS. 5A to 5D show an example of the timing at which images are converted.

FIG. 5A show an example of the readout timing at which images are read from the image sensor 11.

In this example, images are read from the image sensor 11 in units of frames.

FIG. 5B shows an example in which symbols are assigned to images read for each Frame.

FIG. 5C shows an example of conversion images input to the image conversion unit 13. Since images are processed by the image quality adjustment unit 12 which is disposed between the image sensor 11 and the image conversion unit 13, the images are input to the image conversion processor 131 later than the timing when the images are read from the image sensor 11.

FIG. 5D shows an example of the image readout timing.

The image conversion processor 131 increases the frame rate of the whole image or the partial image extracted from the input images in units of frames twice so that the difference in the timings at which the whole image and the partial image are written to the image storage portion 132 is one frame. In the present embodiment, the whole image is illustrated as a conversion image α-n and the partial image is illustrated as a conversion image β-n (where n is a natural number).

The image conversion processor 131 writes the whole image to the first area 132α and the partial image to the second area 132β. The area selection unit 19 reads the whole image and the partial image for two frame periods. Moreover, the difference in the timings at which the area selection unit 19 reads the whole image and the partial image from the image storage portion 132 is one frame. As a result, two kinds of PinP images of which the frame difference is 1 are displayed on the display unit 21.

As described above, since the output of the respective conversion images is updated every two frames, images obtained at different times are combined and output. In this way, the image sensor 11 can output images of every frame without decreasing the frame rate. The output frame rate is 30 fps (frame/second) in the NTSC format, which generates the time difference but does not cause any problem in practical use. Moreover, since the imaging device 1 outputs images, it is possible to construct the imaging system 5 so as to output images continuously in synchronization with a reference vertical synchronization timing signal such as the NTSC analog output.

The image conversion processor 131 may write the one-directional image signal to the first area 132α and write the left-directional image signal and the right-directional image signal to the second area 132β. In this case, the analog encoder 18 displays the left and right split enlarged images in the child PinP screen within the screen displayed by the display unit 21, and displays an image obtained by imaging an area in one direction on the main screen.

[Exemplary Timing Adjustment Process by Timing Adjustment Unit 16]

FIGS. 6A to 6E to FIGS. 9A to 9D show examples of a timing adjustment process by the timing adjustment unit 16 when displaying a partial image in an enlarged scale.

FIG. 6A shows the timing at which image signals are read from the image sensor 11 using a whole image 6.

In FIG. 6A, the timing at which the first pixel (a pixel at the left-top corner of the screen) among the respective pixels of one frame is read is denoted by Ti1, and the timing at which the last pixel (a pixel at the right-bottom corner of the screen) is read is denoted by Tie. After the first pixel is read at the timing Ti1, the horizontal scanning period 1H begins, and one line of pixels up to the right end of the screen are sequentially read. After reading of the first line, pixels on the second line to the last line are sequentially read, whereby all pixels of one frame are read. That is, in the reading of image signals from the image sensor 11 shown in FIG. 6A, a period calculated by (timing Tie)−(timing Ti1) is an effective 1V period.

FIG. 6B shows an example of a partial image 7 in an area set as the specific area Pa in the "personal view mode".

In FIG. 6B, the specific area Pa is depicted by a broken line, the timing at which the pixel at the left-top corner of the specific area Pa is read is denoted by Tin, and the timing at which the pixel at the right-bottom corner is read is denoted by Tim. A period calculated by (timing Tim)−(timing Tin) changes with the size of the specific area Pa. In the present embodiment, a partial image 7 in the specific area Pa is extracted, and the extracted image is output to the display device 2 during the effective 1V period.

FIG. 6C shows an example of the timing at which images are output to the display device 2.

In FIG. 6C, the timing at which the first pixel of the partial image 7 in the specific area Pa is output to the display device 2 is denoted by To1, and the timing at which the last pixel is output to the display device 2 is denoted by Toe.

FIG. 6D shows an example of the timing at which the image sensor 11 outputs image signals.

In this example, the first horizontal period in the 1V period is denoted by "1H", the second horizontal period by "2H", and the x-th horizontal period by "xH".

FIG. 6E shows an example of the timing at which the imaging device 1 outputs image signals.

Due to the image quality processing and image extracting processing, the timing at which the imaging device 1 outputs image signals is generally delayed. However, since it is necessary to output the partial image over the 1V period, the image is maintained in the image storage portion 132 used as a buffer memory.

When outputting the partial image 7 in the specific area Pa shown in FIG. 6B over the effective 1V period expressed by (timing Toe)−(timing To1), it is necessary to output the partial image 7 corresponding to the specific area Pa in the effective 1V period with a delay. In addition, since a delay associated with the image quality adjustment processing by the image quality adjustment unit 12 is also added, the timing at which the image signal is output from the imaging device 1 shown in FIG. 6D is delayed by a predetermined period from the timing at which the image signal is read from the image sensor 11 shown in FIG. 6E.

Therefore, in order to output the partial image 7 of the specific area Pa with a delay, the timing adjustment unit 16 adjusts the timing of reading the image signals from the image sensor 11 and the timing of reading the partial image from the image storage portion 132.

FIGS. 7A to 7E show an example of timing adjustment when displaying a partial image in an enlarged scale in the PinP mode.

FIGS. 7A, 7D, and 7E show an example of the sensor output timing at which the image sensor 11 outputs image signals and the camera output timing at which the imaging device 1 outputs image signals to the display device 2 similarly to FIGS. 6A, 6D, and 6E. However, the amount of timing adjustment when displaying the partial image in an enlarged scale in the PinP mode is not determined uniformly.

FIG. 7B shows an example (first case) in which the whole image 6 is displayed in a reduced scale in the specific area Pa, and the partial image 7 is displayed on the full screen.

FIG. 7C shows an example (second case) in which the partial image 7 is displayed in a reduced scale in the specific area Pa, and the whole image 6 is displayed on the full screen.

In this case, it is difficult to absorb the difference in display timing just through timing adjustment, the timing is adjusted in a manner as shown in FIGS. 8A to 8D or FIGS. 9A to 9D.

FIGS. 8A to 8D show an example (first case) of timing adjustment when a partial image is displayed in an enlarged scale in the PinP mode. The display control unit 17 displays a second image extracted as a specific area on the full PinP screen and displays a first image in the child screen.

Figure 8A:
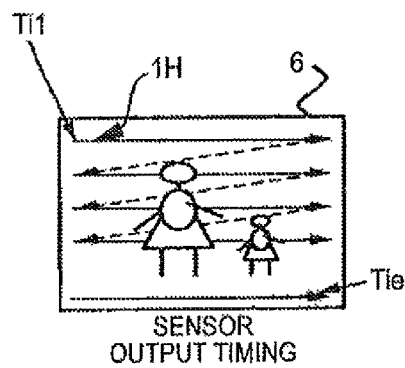
FIGS. 8A to 8D are views illustrating an example (first case) of timing adjustment when displaying a partial image in an enlarged scale in a PinP mode in an exemplary embodiment of the present disclosure.

FIG. 8A shows an example of the timing at which the image sensor 11 outputs image signals.

As described above, the effective 1V period is calculated by the following equation.

$$Tie-Ti1=\text{Effective } 1V \text{ Period}$$

Figure 8C:
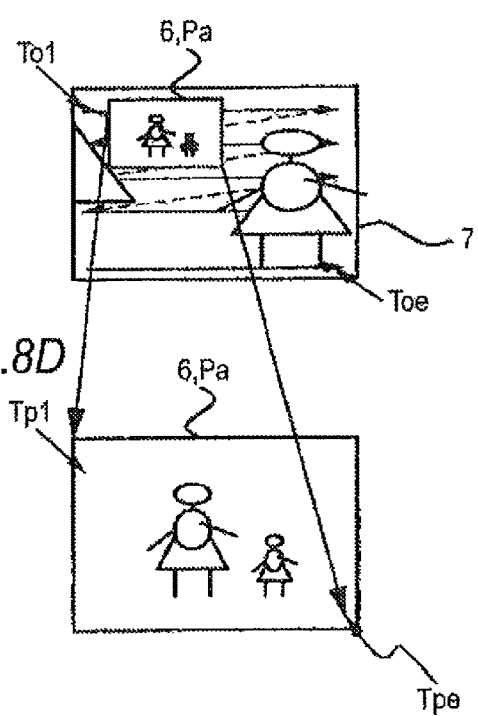
Figure 8B:
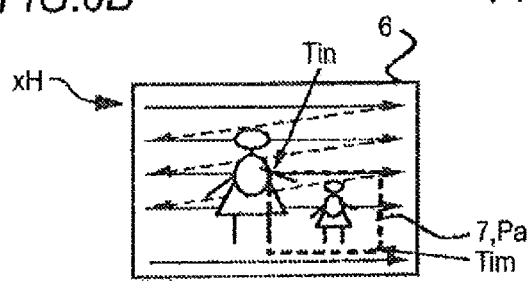

FIG. 8B shows an example of an area in which the partial image 7 is set.

As described above, the specific area Pa in which the partial image 7 is set is variable. Moreover, the variable effective period of the partial image 7 is calculated by the following equation.

$$Tim - Tin = \text{Variable Effective Period}$$

FIG. 8C shows an example of a screen displayed in the PinP mode.

In the PinP presentation mode, the whole image 6 is displayed in a reduced scale in the specific area Pa inside the partial image 7 which is displayed on the full screen. The timing adjustment unit 16 adjusts the image writing timing using the timing adjustment function, and the area selection unit 19 expands and outputs images from the image storage portion 132 based on an instruction of the timing adjustment unit 16. In this case, when the display starting timing of the partial image 7 displayed in an enlarged scale is To1, and the display ending timing is Toe, the effective 1V period is calculated by the following equation.

$$Toe - To1 = \text{Effective 1V Period}$$

Figure 8D:
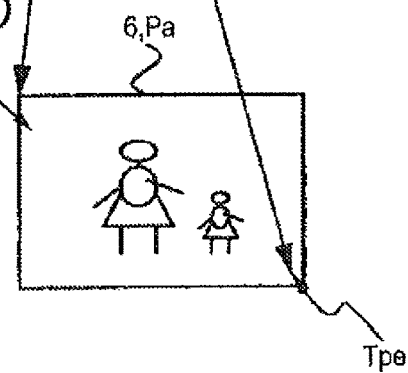

FIG. 8D shows an example of displaying the whole image 6 in an enlarged scale.

Here, when the display starting timing of the whole image 6 is Tp1, and the display ending timing is Tp, the effective 1V period is calculated by the following equation. Here, the display starting timing Tp1 and the display ending timing Tpe are variable depending on the arrangement position of the PinP screen.

$$Tpe - Tp1 = \text{Effective 1V Period}$$

FIGS. 9A to 9D show an example (second case) of timing adjustment when displaying a partial image in an enlarged scale in the PinP mode. The display control unit 17 displays a second image extracted as a specific area on the child PinP screen.

FIGS. 9A and 9B show an example of the sensor output timing and the camera output timing similarly to FIGS. 8A and 8B.

FIGS. 9C and 9D show an example of displaying the whole image 6 on the full screen.

As shown in FIG. 9C, when the display starting timing of the whole image 6 is To1, and the display ending timing is Toe, the effective 1V period is calculated by the following equation.

$$Toe - To1 = \text{Effective 1V Period}$$

As shown in FIG. 9D, the display starting timing Tp1 and the display ending timing Tpe of the partial image 7 displayed in the specific area Pa are variable depending on the arrangement position of the PinP screen.

$$Tpe - Tp1 = \text{Effective 1V Period}$$

FIGS. 10A and 10B show an example in which the left and right images included in the whole image 6 read from the image sensor 11 are enlarged in the vertical and horizontal directions.

FIG. 10A shows an example of an area 9L in which a partial image on the left side of the whole image 6 is included and an area 9R in which a partial image on the right side is included. A left-directional image signal corresponding to an image obtained by imaging the left side of one direction is read from the area 9L. On the other hand, a right-directional image signal corresponding to an image obtained by imaging the right side of one direction is read from the area 9R.

FIG. 10B shows an example in which the image included in the area 9L and the image included in the area 9R are enlarged.

The image conversion processor 131 expands and enlarges the left-directional image included in the area 9L and the right-directional image included in the area 9R among the images read from the image sensor 11. Moreover, the image conversion processor 131 writes the left-directional image signal and the right-directional image signal to the first area 132α so that the image displayed on the display unit 21 based on the image signals read from the first area 132α is displayed without overlap in an enlarged or reduced scales in the vertical and horizontal directions of the screen of the display unit 21. In the present embodiment, the converted left-directional image signal is written to the first split area 132α1, and the converted right-directional image signal is written to the second split area 132α2, whereby left and right images 10L and 10R are generated.

Figure 11:
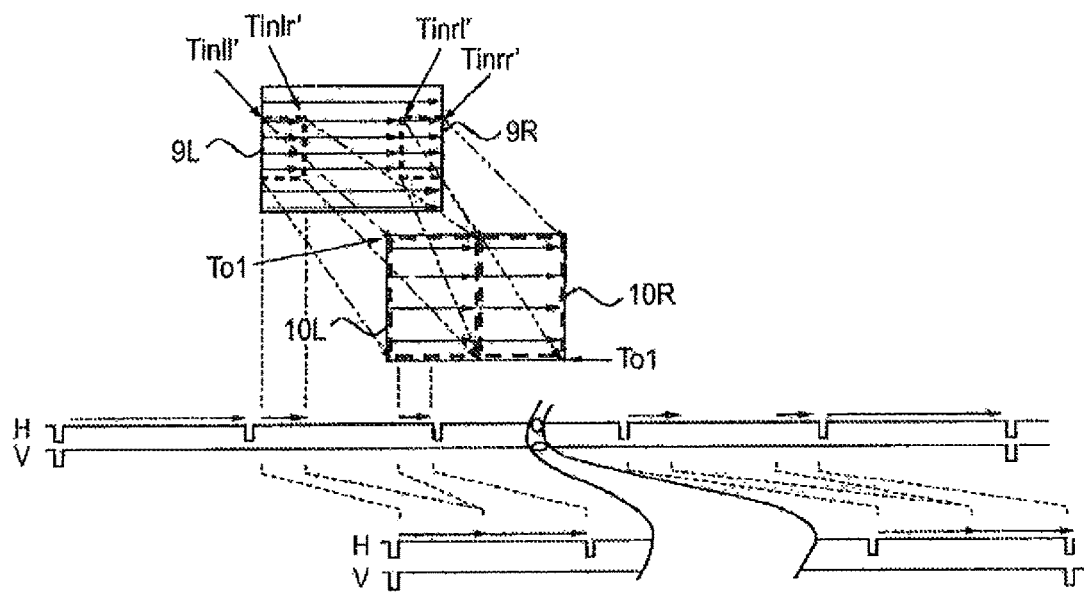
FIG. 11 is a view illustrating an example of an image conversion and enlarging process by an image conversion processor converting and enlarging the left and right small images having been subjected to timing adjustment according to an exemplary embodiment of the present disclosure.

FIG. 11 shows an example of an image conversion process on the left and right images by the image conversion processor 131.

In this example, the timing at which images are extracted from the image sensor 11 to thereby generate enlarged left and right images.

Image signals of the periods of Tinll' to Tinlr' and Tinrl' to Tinrr' in the horizontal direction of the area 9L are read from the image sensor 11. The image conversion processor 131 performs an image expansion/reduction process of continuously outputting the read image signals during an effective 1H period. Moreover, the image conversion processor 131 performs the same timing expansion/reduction process on the left-directional image signal and the right-directional image signal in the vertical direction to thereby generate an image of one frame period.

Figure 12A:
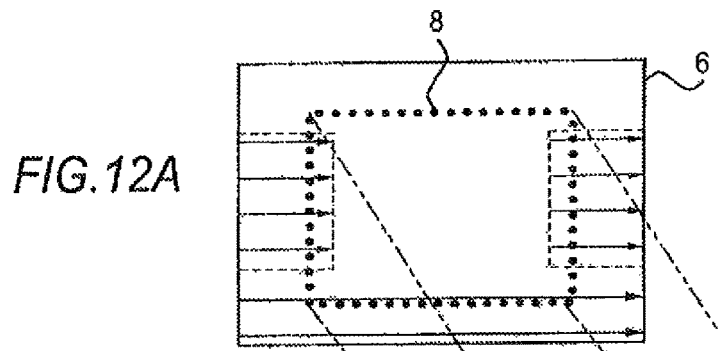
FIGS. 12A and 12B are views illustrating an example of a PinP overlap presentation wherein a central image is displayed so as to overlap with an image enlarged in the horizontal direction in an exemplary embodiment of the present disclosure.
Figure 12B:
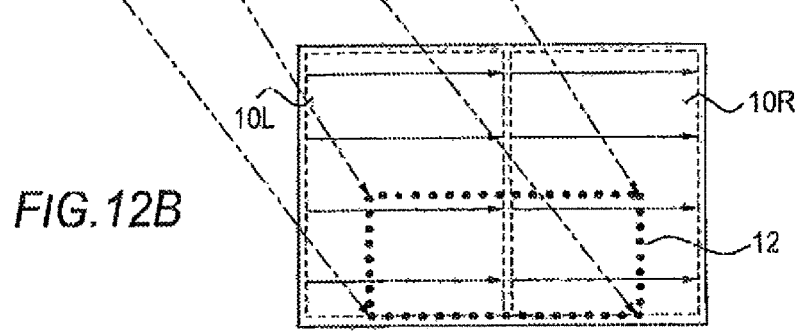

FIGS. 12A and 12B show an example of enlarging the central image included in the whole image 6 read from the image sensor 11.

FIG. 12A shows an example of an area 8 in which a partial image at the center of the whole image 6 is included. A one-directional image signal corresponding to an image obtained by imaging an area in one direction (in the present embodiment, the front direction) is read from the area 8.

FIG. 12B shows an example of enlarging the image included in the area 8 in the horizontal direction.

The image conversion processor 131 expands and enlarges the image included in the area 8 among the images read from the image sensor 11 in the horizontal direction. Moreover, the image conversion processor 131 writes the converted one-directional image signal to the second area 132β to thereby generate a central image so that the central image is displayed on the display unit 21 as PinP on the left and right images shown in FIG. 10B.

FIGS. 13A to 13D show an example of timing adjustment when a partial image is displayed in an enlarged scale on the display unit 21 in the PinP mode.

FIG. 13A shows an example of the sensor output timing at which the image sensor 11 outputs image signals similarly to FIG. 6A.

FIG. 13B shows an example in which areas 8, 9L, and 9R are set in the whole image 6.

In the example shown in FIG. 13C, similarly to FIG. 12B, in the image storage portion 132, the left-directional image signal is written to the first split area 132α1, the right-directional image signal is written to the second split area 132α2, and the one-directional image signal is written to the second area 132β.

FIG. 13D shows an example of an image based on the one-directional image signal written to the second area 132β.

As described above, the image conversion processor 131 arranges the second area 132 so as to comply with the upper, central, and lower parts within the screen displayed on the display unit 21 and writes the one-directional image signal to the second area 132β. Moreover, the image conversion processor 131 enlarges the second area 132β in the horizontal direction on the upper or lower part within the screen and writes the one-directional image signal to the second area 132β. Thus, it can be understood that by expanding the image based on the one-directional image signal written to the second area 132β, a compressed image which is extracted as the area 8 is obtained.

FIG. 14 shows an exemplary top view of an automobile in which the imaging device 1 of the present embodiment is installed.

The imaging device 1 is installed in a bonnet portion on the front side of an automobile and a trunk portion on the rear side, and the display device 2 is installed in the driver's seat inside the vehicle. The imaging devices 1 installed on the front and rear sides have an imaging angle of about 180°. In the present embodiment, the "front direction" of the imaging device 1 provided on the front side is referred to as "one direction", and the "rear direction" of the imaging device 1 provided on the rear side is referred to as "one direction".

Figure 15A:
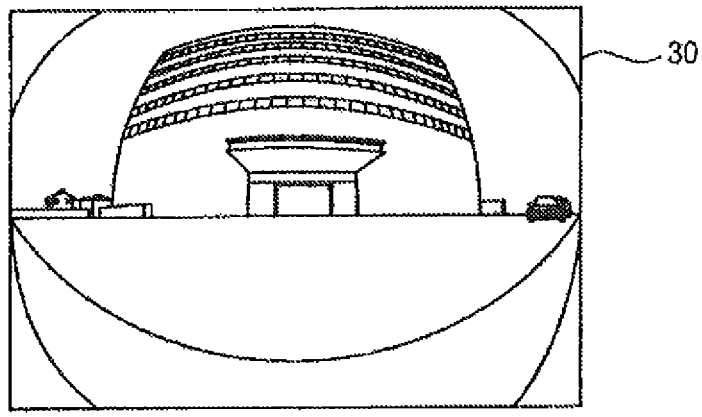
FIGS. 15A to 15C are views illustrating an example of an image (the whole image is disposed on the upper part) of the surroundings of a vehicle, captured with an imaging device according to an exemplary embodiment of the present disclosure.
Figure 15B:
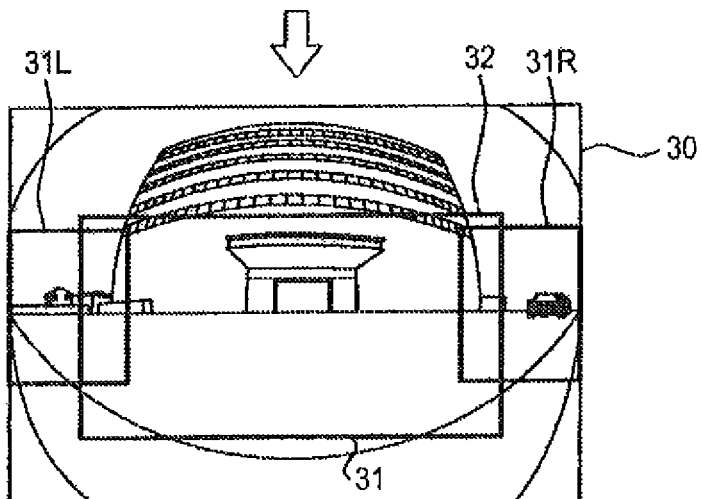
Figure 15C:
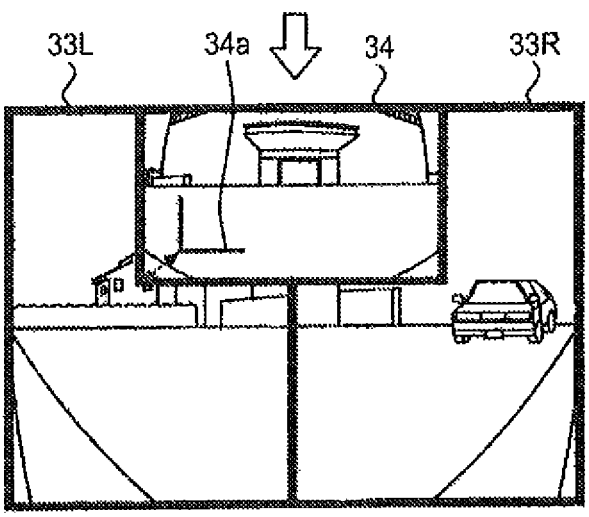

FIGS. 15A to 15C show an example in which an image obtained by imaging the front side of a vehicle is displayed on the upper part of the display unit 21 in the PinP mode.

FIG. 15A shows an example of the full-screen presentation when no image conversion or the like is performed.

In this example, an image 30 captured by the imaging device 1 provided on the rear side of the automobile is displayed. Since the lens used in the imaging device 1 has a large radius of curvature, image distortion at the periphery of the display unit 21 is particularly great. Therefore, the user cannot easily identify a vehicle that is to be focused on and may misunderstand the positional relation such that the approaching vehicle appears to be distant from the driver's vehicle.

FIG. 15B shows an example of images obtained by imaging the front, left, and right sides, included in the image 30.

In this example, areas 31L and 31R located on the left and right sides of the image 30 are displayed in an enlarged scale and are selected as split main screens. Moreover, an area 32 located at the center of the image 30 is selected as the child screen which is displayed as a PinP screen in FIG. 15C. The selection is automatically performed based on the setting value read from the setting value storage portion 15.

In this way, during a transition period in which partial images extracted from the whole image before conversion, normally seen by the driver are displayed in an enlarged scale, the bold frames of areas (areas 31, 31L, and 31R) corresponding to the enlarged portions are temporarily displayed. The period necessary for displaying the frames is about 0.5 to 5 seconds, and the bold frames being displayed calls the attention of the user looking at the child screen displayed as the PinP screen. The respective setting values are determined before the image conversion processor 131 writes the one-directional image signal to the second area 132β and the left-directional image signal and the right-directional image signal to the first area 132α. The image conversion processor 131 adds information representing a specific area specified by the setting values and writes image signals read from the image sensor 11 to the image storage portion 132 as they are. In this way, when the driver looks at the image displayed on the display unit 21 to check other approaching vehicles or the like or the situation on the left and right sides, it is possible to prevent a situation in which the driver fails to recognize a pedestrian in front of the vehicle.

FIG. 15C shows an example in which a main screen and a child PinP screen are displayed together on the display unit 21.

Before displaying an image on the display unit 21, the image conversion processor 131 removes image distortion in the areas 31L, 31R, and 32. Moreover, the left and right images in the areas 31L and 31R shown in FIG. 15B are enlarged, and the left-directional and right-directional images are displayed on left and right screens 33L and 33R splitting the main screen. Moreover, the display control unit 17 which operates in accordance with the operation of the user can display the one-directional image by changing the position and size of a child screen 34 which is displayed as a PinP screen.

In this way, by displaying the images obtained by imaging the left and right sides of the vehicle in an enlarged scale, the user can recognize other vehicles approaching the driver's vehicle. Moreover, by displaying the child screen 34 in which the image included in the area 32 is converted into a reduced scale on the upper part of the screen as a PinP screen, the driver can easily understand the situation of the surrounding of the driver's vehicle. Moreover, the driver can change the size of the child screen 34 displayed as a PinP screen in an enlarged or reduced scale in the direction indicated by the broken arrows. By doing so, even when an automobile or the like included in the left or right screen 33L or 33R approaches the driver's vehicle and appears in an enlarged scale, the display of the child screen 34 is not impaired.

Figure 16:
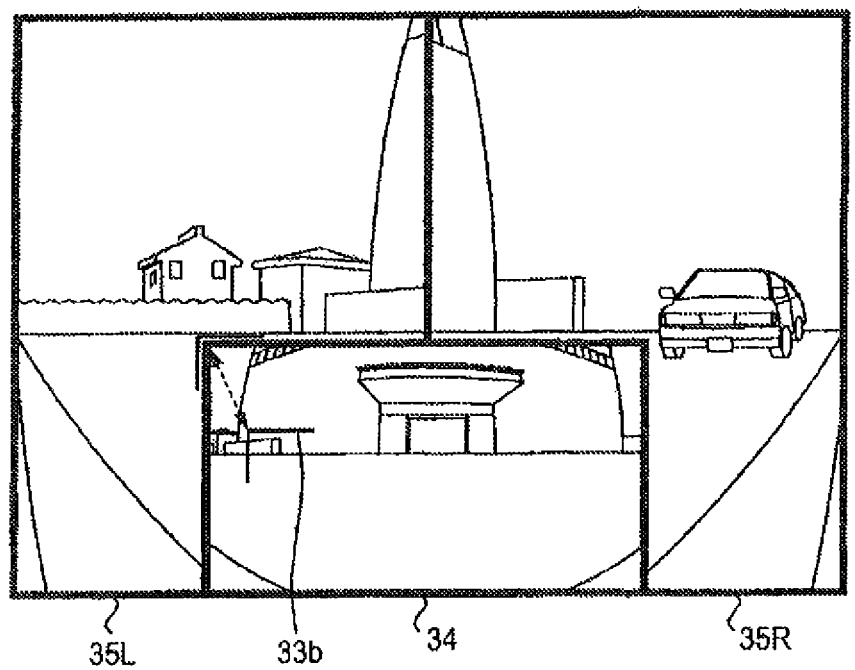
FIG. 16 is a view illustrating an example of an image (the whole image is disposed on the lower part) of the surroundings of a vehicle, captured with an imaging device according to an exemplary embodiment of the present disclosure.

FIG. 16 shows an example in which an image obtained by imaging the front side of a vehicle is displayed in a PinP mode on the lower part of the display unit 21.

In this example, the child screen 34 in which a reduced image is displayed in a PinP mode is set in the central lower part of main screens 35L and 35R in which the left and right images are displayed. The size of the image displayed in the child screen 34 can be changed by enlarging or reducing the child screen 34 in the direction indicated by the broken arrows similarly to the image shown in FIG. 15C. In this way, even when an automobile or the like included in the images displayed in the main screens 35L and 35R approaches the driver's vehicle and appear in an enlarged scale, the display of the child screen 34 is not impaired.

Figure 17:
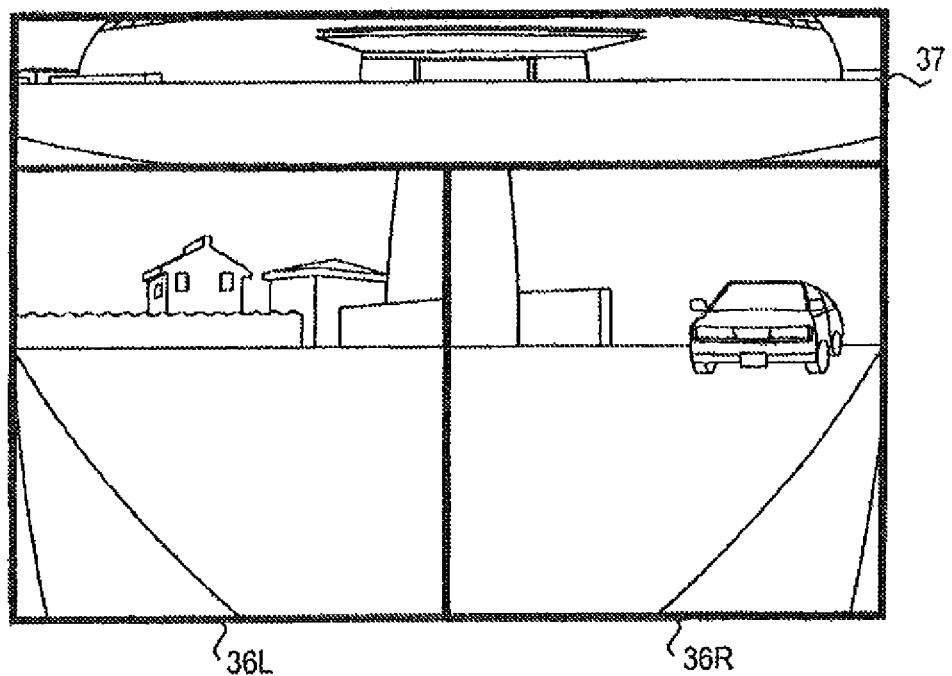
FIG. 17 is a view illustrating an example of an image (the whole image is disposed on the upper part and expanded in the horizontal direction) of the surroundings of a vehicle, captured with an imaging device according to an exemplary embodiment of the present disclosure.
Figure 18:
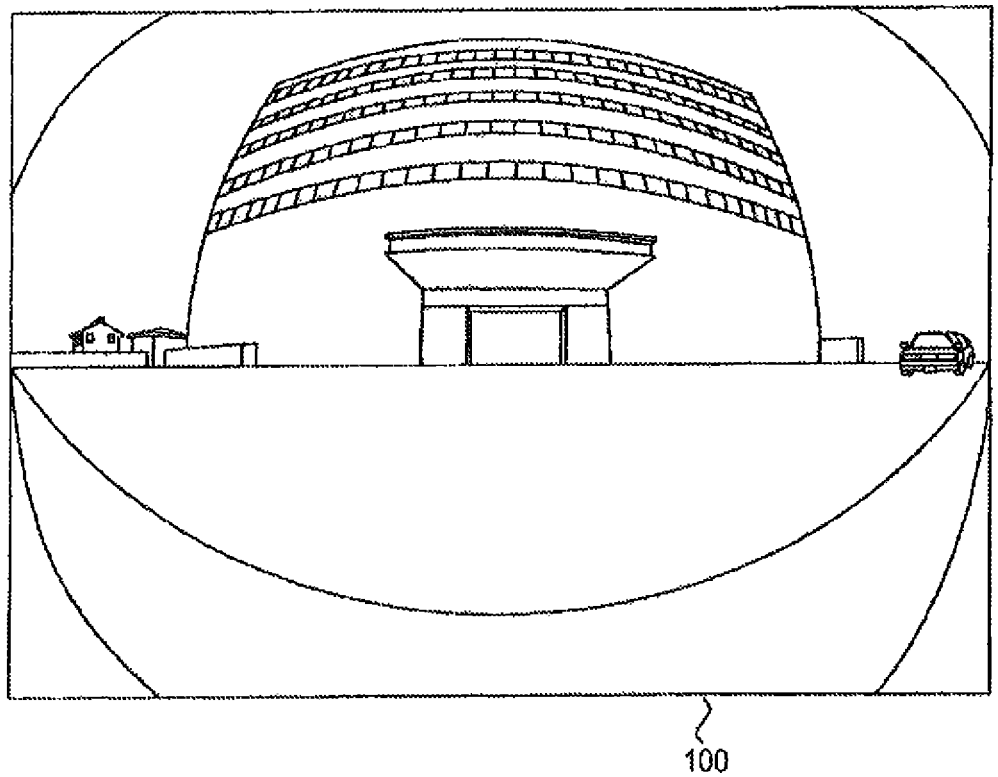
FIG. 18 is a view illustrating an example of an image of the surroundings of a vehicle, captured with an in-vehicle camera of the related art.

FIG. 17 shows an example in which an image obtained by imaging the front side of a vehicle is expanded in the horizontal direction and displayed on th upper part of the display unit 21 in a PinP mode.

In this example, the image of an area 31 is displayed in a PinP mode in a child screen 37 which is arranged on the upper part of the screen of the display unit 21 and which is compressed in the vertical direction and expanded in the horizontal direction. Since the driver can easily observe the front side, the visibility is not impaired even when the child screen 37 is compressed in the vertical direction. Moreover, main screens 36L and 36R displaying the split left and right main screens are arranged below the child screen 37, and the left-directional and right-directional images are displayed in the respective main screens in an enlarged scale. In this case, even when an automobile or the like included in the images displayed in the main screens 36L and 36R approaches the driver's vehicle and appear in an enlarged scale, the display of the child screen 37 is not impaired.

In this way, the image captured on the front or rear side of an automobile is inserted into the child screen which is displayed as a PinP screen. In this case, the arrangement position of the child screen can be appropriately changed to the following position in relation to the whole screen in accordance with the installed state of the imaging device 1, the screen size of the display unit 21, and the purpose of improving the visibility of the driver. That is, the child screen can be appropriately arranged at the following positions: a) the central upper part of the screen; b) the central lower part of the screen; c) the upper horizontal part of the screen; and d) the lower horizontal part of the screen.

According to the imaging system 5 of the exemplary embodiment described above, it is possible to extract parts of an image read from the same image sensor 11 and display any one of a whole image or a partial image in a child screen as a PinP screen. However, in order to display the whole image and the partial image, it is necessary to adjust the timing between image conversion and displaying of images in two ways. Thus, when realizing the PinP presentation function as the child PinP screen, a memory area in which information of images displayed in the child screen is stored is secured in the image storage portion 132 as the second area 132β, and images acquired from the full screen are inserted in advance into the second area 132β. In this way, it is not necessary to adjust the timing during the process of outputting the full screen and the child screen in two ways. In this way, the imaging device 1 disposes the images of the previous frame in a reduced scale in an address area corresponding to the PinP display position in the sequential readout address of "full image memory", used when displaying the full screen.

Moreover, the imaging device 1 has a function of arranging a child screen within an image output by the imaging device 1 having the PinP function. Moreover, under the control of the imaging device 1, the image obtained by imaging the left and right sides of a vehicle is displayed enlarged on the full screen, and the image of the front side of the vehicle is displayed in the child screen. In this way, since it is possible to identify the moving direction of the vehicle and an object approaching the driver's vehicle, the driver can determine whether forward or backward movement of the driver's vehicle will obstruct the path of other vehicles or the like in advance of moving the vehicle. In the related art, when driving a vehicle across a road at a right angle or pulling the vehicle out from a parking garage, it was difficult for the driver to observe other vehicles or pedestrians approaching from the left and right sides from the driver's seat. However, it is possible to observe the left and right-side images and the front and rear-side images of the vehicle in an enlarged scale from a wide-angle image on one screen displayed on the display unit 21 at a low cost. Moreover, it is possible to provide the imaging system 5 at a low cost which enables the driver to safely drive a vehicle from intersections or a parking garage with poor visibility.

Moreover, the output of the respective conversion images are updated every two frames. Thus, images obtained at different times are combined and output to the display unit 21. Therefore, it is possible to output images of every frame to the display unit 21 without decreasing the frame rate of images output by the image sensor 11. Moreover, since the imaging device 1 outputs images to the display device 2, it is possible to construct the imaging system 5 so as to output images continuously in synchronization with a reference vertical synchronization timing signal such as the NTSC analog output.

As described above, the imaging device 1 can capture a wide-angle image as required in an in-vehicle surrounding monitoring camera having the PinP function. From a wide-angle image, it is difficult to understand the details of a local image. In particular, even when a specific area that the user wants to focus on is present in the wide-angle image, it takes a lot of time for the user to realize the situation or the user cannot understand the details from the image as it was. In addition, it is important for the driver to detect a danger in an early stage while driving. In view of such a demand, by providing a function in which the imaging device 1 sets a corresponding partial image in the specific area Pa from the wide-angle image captured by the imaging device 1 in advance and displaying the corresponding image in the child screen or the like as the PinP screen, the driver can easily understand the situation. By doing so, since the driver can observe a specific focusing area in more detail together with the whole image, the driver can easily and quickly understand the surrounding situation.

Moreover, the imaging device 1 has the PinP function of arranging a child screen within the same screen output by the imaging device 1. Thus, the driver or the like can designate a partial image of an area that is difficult for the driver or the like to observe from the whole image with naked eyes in the child screen. Alternatively, it is also possible to display the whole image in the child screen and display a detailed enlarged image of a specific area on the full screen. Moreover, by transmitting the whole image and the partial image to the display device 2 so as to be inserted into the same screen as the PinP screen substantially at the same time, the driver can understand the whole area of the surroundings and the details of the specific area at the same time.

Moreover, since the images are updated every two frames, the image quality adjustment unit 12 adjusts the image qualities of areas which are read at different times and are associated with different imaging areas to the optimum quality, whereby the imaging device 1 can output the respective conversion images. Moreover, since the PinP presentation method is realized by alternately writing frames to the image storage portion 132, it is possible to obtain an additional advantage that it is possible to optimize the exposure control for each area. In the related art, when areas of which the brightness changes greatly are displayed in the PinP mode, some images may appear too dark or too bright. However, by adjusting the image quality of images displayed in each area to the optimum quality, it is possible to adjust the brightness of images based on image signals written to the respective areas in units of frames. Therefore, the imaging device 1 can output images which are generally easily understood by the driver.

In the existing in-vehicle imaging devices for monitoring the surroundings, monitoring areas are set in advance for the purpose of observing specific areas that are set in the course of manufacturing. Although there are products in which visual management areas can be designated before shipment from factories, there is no product in which monitoring areas can be designated taking low-visibility situation associated with the respective users' driving environment into consideration. On the other hand, according to the imaging system 5, since the driver can designate low-visibility areas under the driver's driving environment and maintain the designated areas, it is possible to monitor the surroundings effectively, for example, when parking in a narrow space at the driver's home.

2. Modified Example

As shown in FIGS. 4A to 4C, the present disclosure can be applied to not only a configuration in which the display of the PinP screen is controlled using one image storage portion 132 but also a configuration in which a plurality of image storage portions 132 are provided so as to correspond to the number of areas.

The present disclosure is not limited to the above-described embodiment, but various applications and modifications can be made without departing from the spirit of the present disclosure described in the claims.

The present disclosure contains subject matter related to that disclosed in Japanese Priority Patent Application JP 2010-191376 filed in the Japan Patent office on Aug. 27, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control system for a vehicle having a camera comprising:
    a distortion correcting unit configured to correct a left side region distortion and a right side region distortion of a first wide-angle image derived from a captured image captured by a single camera of the vehicle with a wide angle lens, the first wide-angle image including the left side region distortion and the right side region distortion based on the wide angle lens;
    an image generating unit configured to generate a second wide-angle image derived from the captured image, the second wide-angle image including a left-directional image, a right-directional image and a one-directional image based on the first wide-angle image; and
    a control unit configured to selectively display either (a) the first wide-angle image with distortion or (b) the second wide-angle image;
    wherein the left-directional image in the second wide-angle image is generated based on the distortion-corrected left side region of the first wide-angle image and is positioned at the left side in the display of the second wide angle image;
    wherein the right-directional image in the second wide-angle image is generated based on the distortion-corrected right side region of the first wide-angle image and is positioned at the right side in the display of the second wide angle image; and
    the display on a display device in the vehicle of the first wide angle image with distortion is changed over to display on the display device the second wide angle image in response to a selection input.

2. The display control system according to claim 1, wherein the control unit is configured to control the display to display a rectangular image as the one-directional image.

3. The display control system according to claim 1, wherein the one-directional image is displayed on an upper portion of the display.

4. The display control system according to claim 3, wherein the one-directional image is displayed as a horizontally expanded image.

5. The display control system according to claim 1, wherein the left-directional image, the right-directional image and the one-directional image are displayed in respective display areas on the display device; wherein at least one of the display area of the left-directional image or the right-directional image is larger than the display area of the one-directional image.

6. The display control system according to claim 1, wherein the captured image is a rearward image of the vehicle and includes an image of the exterior of the vehicle.

7. The display control system according to claim 1, wherein the camera exhibits a viewing angle of about 180 degrees.

8. The display control system according to claim 1, further including the camera.

9. The display control system according to claim 1, further including the display device.

10. A display control apparatus for a vehicle having a camera comprising circuitry configured to:
    correct a left side region distortion and a right side region distortion of a first wide-angle image derived from a captured image captured by a single camera of the vehicle with a wide angle lens, the first wide-angle image including the left side region distortion and the right side region distortion based on the wide angle lens;
    generate a second wide-angle image derived from the captured image, the second wide-angle image including a left-directional image, a right-directional image and a one-directional image based on the first wide-angle image; and
    selectively display either (a) the first wide-angle image with distortion or (b) the second wide-angle image;
    wherein the left-directional image in the second wide-angle image is generated based on the distortion-corrected left side region of the first wide-angle image and is positioned at the left side in the display of the second wide angle image;
    wherein the right-directional image in the second wide-angle image is generated based on the distortion-corrected right side region of the first wide-angle image and is positioned at the right side in the display of the second wide angle image; and
    the display on a display device in the vehicle of the first wide angle image with distortion is changed over to display on the display device the second wide angle image in response to a selection input.

11. The display control apparatus according to claim 10, wherein the one-directional image is a rectangular image.

12. The display control apparatus according to claim 10, wherein the left-directional image, the right-directional image and the one-directional image are displayed in respective display areas on the display device; wherein at least one of Gall the display area of the left-directional image or the right-directional image is larger than flail the display area of the one-directional image.

13. The display control apparatus according to claim 10, wherein the captured image is a rearward image of the vehicle and includes an image of the exterior of the vehicle.

14. The display control apparatus according to claim 10, wherein the camera exhibits a viewing angle of about 180 degrees.

15. A method for controlling a display for a vehicle having a camera, comprising:
    correcting a left side region distortion and a right side region distortion of a first wide-angle image derived from a captured image captured by a single camera of the vehicle with a wide angle lens, the first wide-angle image including the left side region distortion and the right side region distortion based on the wide angle lens;

generating a second wide-angle image derived from the captured image, the second wide-angle image including a left-directional image, a right-directional image and a one-directional image based on the first wide-angle image; and selectively displaying either (a) the first wide-angle image with distortion or (b) the second wide-angle image;

wherein the left-directional image in the second wide-angle image is generated based on the distortion-corrected left side region of the first wide-angle image and is positioned at the left side in the display of the second wide angle image;

wherein the right-directional image in the second wide-angle image is generated based on the distortion-corrected right side region of the first wide-angle image and is positioned at the right side in the display of the second wide angle image; and the display on a display device in the vehicle of the first wide angle image with distortion is changed over to display on the display device the second wide angle image in response to a selection input.

16. The method according to claim 15, wherein the one-directional image is a rectangular image.

17. The method according to claim 15, wherein the left-directional image, the right-directional image and the one-directional image are displayed in respective display areas on the display device; wherein at least one of the display area of the left-directional image or the right-directional image is larger than the display area of the one-directional image.

18. The method according to claim 15, wherein the captured image is a rearward image of the vehicle and includes an image of the exterior of the vehicle.

19. The method according to claim 15, wherein the camera exhibits a viewing angle of about 180 degrees.

* * * * *